(12) United States Patent
Nicklas

(10) Patent No.: US 7,763,822 B2
(45) Date of Patent: Jul. 27, 2010

(54) HYBRID TUBULAR WIRE ELECTRODE FOR SUBMERGED ARC WELDING

(75) Inventor: Peter J. Nicklas, Troy, OH (US)

(73) Assignee: Hobart Brothers Company, Troy, OH (US)

( * ) Notice: Subject to any disclaimer, the term of this patent is extended or adjusted under 35 U.S.C. 154(b) by 1180 days.

(21) Appl. No.: 10/714,090

(22) Filed: Nov. 14, 2003

(65) Prior Publication Data

US 2005/0103751 A1 May 19, 2005

(51) Int. Cl.
*B23K 9/18* (2006.01)
*B23K 25/00* (2006.01)

(52) U.S. Cl. .................. 219/73; 219/146.1; 219/145.23

(58) Field of Classification Search ............ 219/73, 219/73.22, 145.22, 145.32, 146.23, 146.24, 219/146.51, 146.1; 148/22, 23, 26
See application file for complete search history.

(56) References Cited

U.S. PATENT DOCUMENTS

| | | | |
|---|---|---|---|
| 3,423,565 A * | 1/1969 | Malchaire | 219/146.52 |
| 3,531,620 A * | 9/1970 | Arikawa et al. | 219/146.52 |
| 3,573,426 A * | 4/1971 | Blake et al. | 219/137 WM |
| 3,855,015 A * | 12/1974 | Nemoto et al. | 492/3 |
| 3,924,091 A * | 12/1975 | Suzuki et al. | 219/73 |
| 4,072,845 A * | 2/1978 | Buckingham et al. | 219/146.3 |
| 4,149,063 A * | 4/1979 | Bishel | 219/146.23 |
| 4,221,611 A * | 9/1980 | Nagano et al. | 148/26 |
| 4,343,984 A * | 8/1982 | Smith et al. | 219/146.3 |
| 4,430,122 A * | 2/1984 | Pauga | 428/385 |
| 4,571,480 A * | 2/1986 | Sakai et al. | 219/146.3 |
| 5,233,160 A * | 8/1993 | Gordish et al. | 219/137 WM |
| 5,861,605 A * | 1/1999 | Ogawa et al. | 219/145.22 |
| 6,784,401 B2 * | 8/2004 | North et al. | 219/145.22 |

FOREIGN PATENT DOCUMENTS

| | | |
|---|---|---|
| JP | 58135793 | 8/1983 |
| JP | 63212092 | 9/1988 |

* cited by examiner

*Primary Examiner*—M. Alexandra Elve
(74) *Attorney, Agent, or Firm*—Houston Eliseeva, LLP

(57) ABSTRACT

The hybrid wire of the present invention comprises approximately 1% Wt to 30% Wt of non-metallic ingredients, with the preferred concentrations selected from the range from about 5% Wt to about 15% Wt. Non-metallic compounds and metallic oxides, which were added to the tubular wires and found to perform well in the SAW process, are $CaO$, $MgO$, $MgAl$, $K_2O$, $CaF_2$, $MnO$, $NaAlF_6$, and $K_2AlF_6$. Adding one or more of the listed compounds to the core composition of the tubular wires leads to an improvement of the welding performance in a SAW process due to the properties of core of the wire, while reducing the importance of the granular flux.

3 Claims, 5 Drawing Sheets

TABLE 1

| Raw Material | 047N-01-003 | 047N-03-001 | 047N-03-002 | 047N-03-003 | 047N-03-006 | 047N-03-007 | 047N-03-008 | 047N-03-009 | 047N-03-010 | 047N-03-011 |
|---|---|---|---|---|---|---|---|---|---|---|
| Fe Powder | 83.65 | 77.25 | 73.25 | 73.25 | 90.75 | 90.25 | 87.75 | 83.25 | 81.25 | 61.25 |
| Ferro Mg, Hi C | 3.75 | 3.75 | 3.75 | 3.75 | 3.75 | 3.75 | 3.75 | 3.75 | 3.75 | 3.75 |
| Ferro Si | 1.60 | 5.00 | 5.00 | 5.00 | 5.00 | 5.00 | 5.00 | 5.00 | 5.00 | 5.00 |
| Alumina, $Al_2O_3$ |  | 7.00 | 7.00 | 7.00 | 0.50 | 0.50 | 1.00 | 3.00 | 3.00 | 7.00 |
| Alumina, $Al_2O_3$ with $Na_2O_3$ |  | 7.00 | 7.00 | 7.00 |  | 0.50 | 0.50 | 3.00 | 3.00 | 7.00 |
| $MgCO_3$ |  |  |  |  |  |  |  |  |  | 1.00 |
| MgAl, 40x200m |  |  |  | 4.00 |  |  | 2.00 |  | 2.00 | 4.00 |
| $CaF_2$ |  |  |  |  |  |  |  |  |  | 4.00 |
| MgAl, -200m |  |  | 4.00 |  |  |  |  | 2.00 |  |  |
| $CaCO_3$ | 4.00 |  |  |  |  |  |  |  | 2.00 | 4.00 |
| Fluorspar, $CaF_2$ | 5.00 |  |  |  |  |  |  |  |  | 1.00 |
| MgO | 2.00 |  |  |  |  |  |  |  |  | 2.00 |
| Approx slag, % | 11.00 | 14.00 | 18.00 | 18.00 | 0.50 | 1.00 | 3.50 | 8.00 | 10.00 | 30.00 |
|  | 100.00 | 100.00 | 100.00 | 100.00 | 100.00 | 100.00 | 100.00 | 100.00 | 100.00 | 100.00 |

FIG. 3

TABLE 2

| Flux Composition | Wt% |
|---|---|
| Bauxite/$Al_2O_3$ | 30% |
| Fluorides | 15% |
| Silicates and binders | 10% |
| Magnesite | 10% |
| Manganese Compounds | 10% |
| Quartz, $SiO_2$ | 5% |
| Silicon | <5% |
| Mineral Silicates | <5% |
| Iron | <5% |

FIG. 4

TABLE 3
Deposit Chemistries

| Element | Carbon Steels | Low Alloy Steels |
|---|---|---|
| C | 0.15 | 0.15 |
| Mn | 1.80 | 2.10 |
| Si | 0.90 | 0.80 |
| P | 0.030 | 0.030 |
| S | 0.030 | 0.030 |
| Cr | — | 8.0 |
| Ni | — | 4.0 |
| Mo | — | 1.0 |
| Cu | 0.30 | 0.75 |
| Ti+V+Zr | — | 0.030 |

FIG.5

HYBRID TUBULAR WIRE ELECTRODE FOR SUBMERGED ARC WELDING

FIELD OF THE INVENTION

The present invention relates to the field of submerged arc welding. More specifically, the invention relates to compositions of a hybrid tubular wire electrode enhancing the performance of wire/flux combination used in the submerged arc welding process.

BACKGROUND OF THE INVENTION

Submerged arc welding (SAW) is a process in which joining of metal pieces is accomplished by heating the metal pieces with an arc existing between an electrode and the metal. In the submerged arc welding process the arc and the molten metal are shielded from the atmospheric oxygen and nitrogen by a blanket of fusible granular flux, which covers the arc. The welding electrode of the submerged arc welding process is a consumable wire electrode continuously fed to the welding process. The flux covering the arc significantly reduces spatter, smoke, and arc flashes, allowing higher utilization the wire electrode at higher welding speeds and deposition rates.

The consumable wire electrodes used in the SAW process are predominantly solid carbon or low alloy steel electrodes, where a specific combination of the wire/flux composition is required for the optimal performance and weld quality. Most of the oxides and compounds incorporated into the flux cannot be added during the steelmaking process because of the differences in the melting temperatures and the problem with their solubility in steel. The resulting metal would have gross inclusions and be very weak. The solution to the problem is to use tubular wire electrodes consisting of a mild steel sheath and a core composition comprising desired elements and compounds in the powdered form. Such a design allows the weld deposits to have the required chemistry without impeding the manufacturing of the consumable electrodes. Tubular electrodes, such as metal-cored and flux-cored electrodes, have also been used in SAW for specialty alloys that are too difficult to draw as a solid wire to the size which is appropriate for the SAW process. For example, hard surfacing applications require the addition of special elements for wear resistance and impact abrasion. Nevertheless, it is attractive to use tubular electrodes in the SAW process to increase the welding deposition rates and control the weld chemistry by selecting the appropriate chemistry of the wire electrode.

The main ingredients in both metal-cored and flux-cored wires are powdered ferro-alloys. In addition, flux-cored electrodes contain non-metallic compounds to help stabilize the arc and create a desired molten slag composition with such physical properties that allow the molted slag to protect the molten weld metal from various undesirable reagents in the atmosphere. Metal-cored wires typically have no more that 5% of non-metallic compounds and metal oxide powder additions in the core (fill percentage) to help stabilize the arc. Flux-cored electrodes are designed to have non-metallic and metallic oxide ingredients of approximately 20-30% by weight to create the physical slag of desired properties during the welding process.

Currently the solid wires used in the SAW process work with the granular flux, yielding up to 99% deposition efficiency. The performance of such welding process is determined mostly by the composition of the granular flux, and much less so by the composition of the wire electrode. Currently, almost 100% of the structural steel market (carbon and HSLA steels) use solid wires When using flux-cored wire electrodes for SAW, deposition efficiency falls down to about 80%. Welding performance in that case is determined by both the fluxed core of the wire and the granular flux, which turns out to be less efficient.

SUMMARY OF THE INVENTION

The present invention is a hybrid tubular wire electrode for the SAW process in which not only the external granular flux, but also the composition of the tubular wire itself is a source of the performance oxides. The welding performance is typically controlled by the granular flux: stabilizing the arc and influencing the metal/slag interface, are more controlled by the composition of the core of the hybrid tubular wire. Since the hybrid tubular wire mostly controls the welding parameters, the traditional role of the flux in the SAW process is minimized, meaning that less expensive fluxes can be used without negatively affecting the welding performance and results. The term "hybrid wire" has been chosen to reflect the fact that the tubular wire of the present invention does not fall into the accepted industry categories for either flux-cored or metal cored wires. Metal-cored wires are defined as the ones having less than 5% Wt of non-metallic ingredients. Flux-cored wires are defined as the ones having between about 15% Wt and 30% Wt of non-metallic ingredients.

The hybrid wire of the present invention comprises approximately 1% Wt to 30% Wt of non-metallic ingredients, with the preferred concentrations selected from the range from about 5% Wt to about 15% Wt. Non-metallic compounds and metallic oxides, which were added to the tubular wires and found to perform well in the SAW process, are CaO, MgO, MgAl, $K_2O$, $CaF_2$, MnO, $NaAlF_6$, and $K_2AlF_6$. Adding one or more of the listed compounds to the core composition of the tubular wires leads to an improvement of the welding performance in a SAW process due to the properties of core of the wire, while reducing the importance of the granular flux.

BRIEF DESCRIPTION OF THE DRAWINGS

FIG. 3 is a table showing compositions of the tested hybrid tubular wires.

FIG. 4 is a table showing a composition of the flux.

FIG. 5 is a table showing steel compositions.

DETAILED DESCRIPTION OF THE PREFERRED EMBODIMENTS

The SAW process is usually operated in an automatic or semi-automatic manner, in which a consumable wire electrode is continuously fed from a reel or spool to a welding gun. The welding gun travels with a predetermined speed along a metal work piece having a granular flux already deposited on the surface of the metal pieces. The granular flux can be deposited on the work piece before the beginning of the SAW operation or it can be fed through a nozzle of a hopper or a flux tank coupled to the welding gun and deposited during the welding process.

Figure 1:
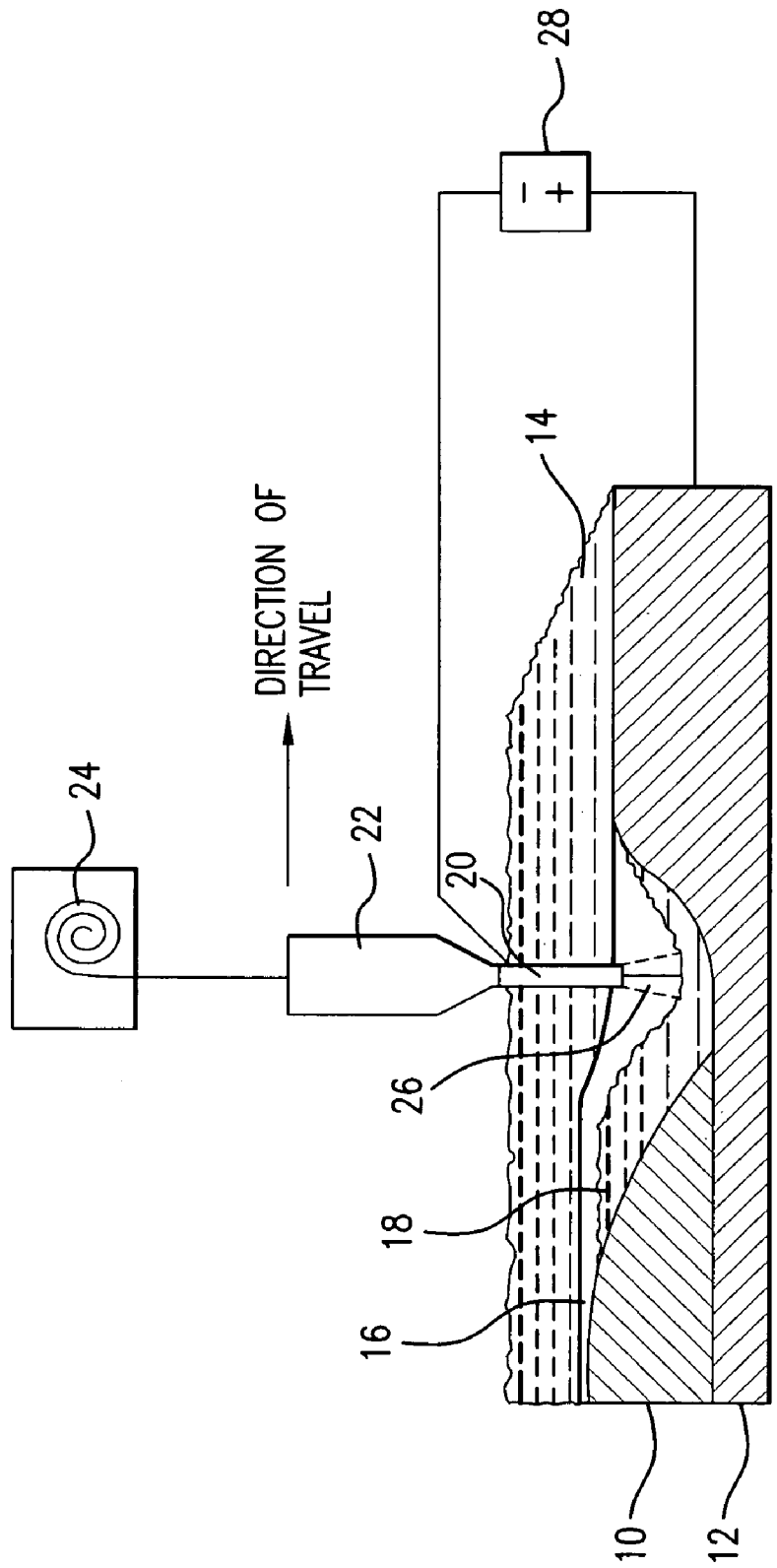
FIG. 1 is a schematic illustration of the submerged arc welding process.

During the SAW process the heat generated by arc 26 and the tip of consumable electrode 20 melts flux 14 as welding gun 22 and electrode 20 move along metal work piece 12, as it can be seen in FIG. 1. In the SAW process a power source 28 is connected to metal piece 12 and electrode 20. DC or AC can be used for submerged arc welding with the welding currents in the range from 500 to 1500 Amperes. The tip of electrode 20 and arc 26 are shielded by unfused flux 14. The flux deposited on the surface of the metal work piece usually contains deoxidizers and other compounds helping to remove impurities from the molted metal and introduce alloying elements and compounds into the weld. As the electrode submerged in the flux moves along he metal work piece, the flux melts, forms molten flux 16, and rises above the molten metal 18 to forms a slag. Consumable wire electrode 20 is fed to the welding gun from reel 24, as shown in FIG. 1. The weld metal usually has a higher freezing temperature and solidifies before the molten slag, which remains molten for a longer time. The molten slag covers the solidified weld metal as a protective layer until the weld metal further cools and becomes less reactive. When the weld metal becomes solid (shown as 10 in FIG. 1) and sufficiently cool, the unmelted flux and the slag are removed from the weld. Base metals which are weldable by the SAW process comprise wrought iron, low carbon steels, low alloy steels, stainless steels, and possibly high and medium carbon, and alloys steels. The compositions of the test wires presented in Table 1 of FIG. 3 are well balanced for welding carbon steels. Examples of the chemistries of the carbon and low alloy steels that can be welded by the hybrid electrode of the present invention are shown as Table 3 in FIG. 5 (in Wt %). The formulations presented in Table 1 can be easily reformulated based on the presented base compositions for welding any HSLA steel using the SAW process.

Figure 2:
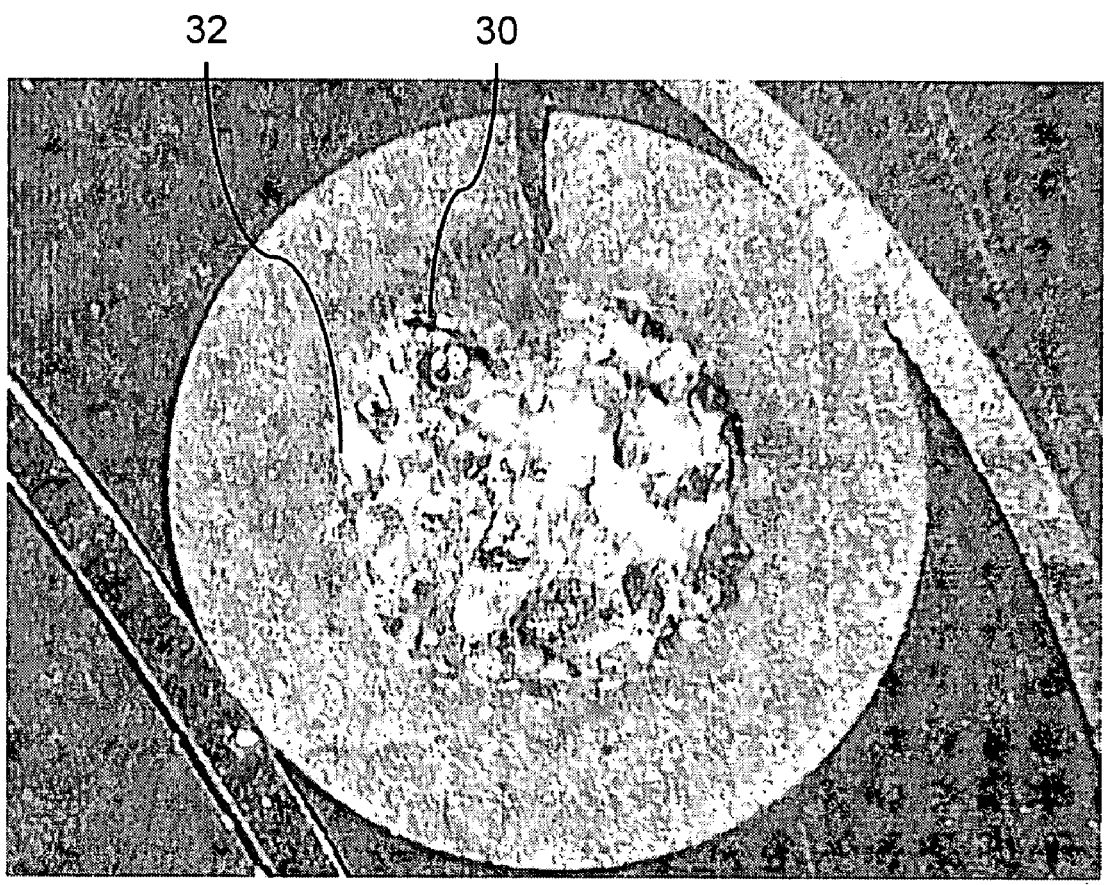
FIG. 2 is a cross section of the hybrid tubular wire.

A hybrid tubular wire of the present invention for the SAW process comprises a metal sheath 30 and a core 32, as shown in FIG. 2. The core is characterized by a composition of metallic oxides and non-metallic ingredients. The detailed chemical composition of the core of the wire of the present invention is provided in Table 1 shown in FIG. 3. Presented in Table 1 are 10 exemplary compositions with the total percentage of non-metallic compounds ranging from 11% Wt to 30% Wt. It should be noted, though, that the desired effect was observed in the wires with the percentage of non-metallic compounds as low as 1% Wt. The compositions were selected based on the following considerations. When the flux melts, it creates a molten slag which forms a physical barrier between the molten metal of the work piece and the atmosphere (in particular, the nitrogen and oxygen). The difficulty in selecting the appropriate composition of the wire, and especially the core composition, is in coming up with such molten slag system that is sufficiently viscous and, at the same time, sufficiently liquid for the purpose of the SAW process. In particular, on the one hand, the molten slag should be viscous enough to remain above the molten metal of the work piece and not drop off the weld piece, as it could be the case if the molten slag were too liquid. On the other hand, the molten slag shouldn't be too viscous to prevent degazation of the molten pool of metal below the molten slag. Also, careful consideration has been given to the properties of the slag/metal interface to achieve the desired ease of removing the slag from the weld after the SAW process is complete and the slag and the work piece have solidified and cooled down. To achieve the desired property of the slag/metal interface, the composition of the slag (and, consequently, the core composition of the tubular wire), should be such that the molten slag should have a higher solidification temperature than that of the molten metal of the work piece. If the slag stays molten longer than the metal of the work piece, the weld bead has a better appearance. Also, there needs to be a sufficient difference between the coefficients of thermal expansion of the slag and the metal of the work piece to allow the solid slag to be easily removed from the solid weld.

The compositions of the tubular wires presented in Table 1 of FIG. 3 were selected to achieve the above-described properties of the slag and the molten metal of the work piece, with the goal of using the chemistry of the wires to enhance the performance of those wires, therefore, enhancing the performance of the wire/flux combination in the SAW process. The non-metallic compounds and metallic oxides added to the core compositions were $Al_2O_3$, $Al_2O_3$ with $Na_2O_3$, $MgCO_3$, MgAl, $CaF_2$, $CaCO_3$, $CaF_2$, MgO. Table 2 in FIG. 4 presents the composition of the flux which was used in the test weld runs with the test wire compositions. As the test weld runs demonstrated, wire composition 047N-03-001 exhibited the best performance. The release of the slag was the easiest and the fastest over a solid non-tubular wire at the same amperage.

The process of manufacturing a tubular wire of the present invention involves a series of steps in which a strip (or a sheath material) is fed through the shaping dies which bend the strip and form it into a shape that can later be filled with the ingredients of the core composition. Usually, the shape is a U-shape. The shaped sheath is then filled with the core composition which has a combination of non-metallic compounds and metallic oxides, such as $Al_2O_3$, $Al_2O_3$ with $Na_2O_3$, $MgCO_3$, MgAl, $CaF_2$, $CaCO_3$, $CaF_2$, MgO. The wire then travels through the closing dies which close it into a tubular form in which the sheath completely encapsulates the core, forming a cored wire as illustrated in FIG. 2. The ingredients of the core composition are often powdered, which powder becomes compacted when the encapsulated wire is fed through the drawing dies to reduce the wire's diameter to the final desired size.

A welding apparatus for the SAW process utilizing the tubular wire of present invention is shown as an illustrative example in FIG. 1. The welding apparatus comprises power supply 28 (AC or DC), welding gun 22 with electrode 20 and means 24 for feeding the electrode into the welding gun. An example of the means 24 for feeding the electrode shown in FIG. 1 is a wire drive and a wire reel 22. It should be understood, of course, that any other way of feeding the wire electrode into the welding gun falls within the scope and spirit of the present invention. Granular flux 14 is provided on the surface of welding work piece 10 either through a nozzle connected to the welding gun or independently before the beginning of the SAW welding process. One possible flux composition is provided in Table 2 of FIG. 4. Electrode 20 has a sheath and a core characterized by a core composition comprising non-metallic compounds and metallic oxides in accordance with the compositions as shown in Table 1 of FIG. 3. The power source supplies AC or DC current to the electrode and the arc is formed between the wire electrode 20 and the work piece 12 as shown in FIG. 1, providing the heat necessary for melting flux 14 and the tip of wire electrode 20.

To form a weld on a work piece using the SAW apparatus with a novel hybrid tubular wire electrode of the present invention, a welding process uses a welding apparatus with means for feeding the wire electrode and means for supplying a flux on the surface of the work piece. The means for feeding the wire into the welding apparatus can comprise a wire drive and a wire reel, or any other suitable arrangement supplying the wire into the apparatus with the speed sufficient to replace the portion of the wire consumed during the SAW process. It is contemplated that the means for feeding the wire into the welding apparatus can be internal or be located outside of the apparatus. The welding apparatus is coupled to a DC or AC power supply and the arc is formed between the electrode and the work piece on which the weld is to be formed. Feeding the hybrid tubular wire electrode of the present invention into the welding apparatus involves providing the wire with a sheath and a core having a core composition comprising one or more compounds selected from the group consisting of $Al_2O_3$, $Al_2O_3$ with $Na_2O_3$, $MgCO_3$, MgAl, $CaF_2$, $CaCO_3$, $CaF_2$, MgO. The welding gun moves along the work piece, as shown by the direction of travel in FIG. 1, while wire electrode 20 is submerged in flux 14. Flux 14 is typically deposited onto the surface of the work pieces either before the beginning of the SAW process or during the welding process. If the flux is deposited onto the work pieces during the welding process, it is usually done via a nozzle connected to the welding gun. As welding gun 22 moves along work piece 12, the heat generated by arc 26 melts the tip of wire electrode 22 and the granular flux around the tip of the electrode, forming the pool of molted metal 16 of work piece 12 below the pool of molten slag 18. As the welding gun moves along its direction of travel, solidified weld metal 10 forms the weld. Molten slag 16 also solidifies and is later removed from the weld.

It has been, therefore, demonstrated that an addition of one or more specified non-metallic ingredients from the range of 1% Wt to 30% Wt to the core of a tubular wire electrode formulated for the SAW process improves the welding performance due to the properties of the core. The written description of the invention enables one skilled in the art to make and use what is at present considered to be the best mode of the invention, and it should be appreciated and understood by those skilled in the art that the existence of variations, combinations, modifications and equivalents falls within the spirit and scope of the specific exemplary embodiments disclosed herein. It is also to be understood that the illustrative examples described herein are not to be construed as limiting the present invention in any way. The objects, features and advantages of the present invention as claimed in the appended claims are applicable to all types of metal core wires, such as low carbon metal core, stainless steel metal core and low alloy metal core wires.

What is claimed is:

1. A tubular weld wire comprising: a steel sheath encapsulating a core; the core formulated for submerged arc welding and comprising one or more non-metallic compounds selected from the group of non-metallic compounds consisting of $Al_2O_3$, $Na_2O_3$, $MgCO_3$, MgAl, $CaF_2$, $CaCO_3$, MgO and combinations thereof, wherein the total percentage of one or more non-metallic compounds in the core composition ranges from about 1% Wt to about 30% Wt and wherein the non-metallic compounds are $Al_2O_3$ and $Na_2O_3$ with the total percentage of 14% Wt.

2. The tubular weld wire of claim 1, wherein the core composition further comprises compacted Fe, FeMg, and FeSi.

3. The tubular weld wire of claim 1, wherein the total percentage of one or more non-metallic compounds ranges between 5% Wt and 15% Wt.

* * * * *